(12) United States Patent
Park et al.

(10) Patent No.: US 9,412,032 B2
(45) Date of Patent: Aug. 9, 2016

(54) SCHEDULE MANAGING METHOD AND APPARATUS USING OPTICAL CHARACTER READER

(75) Inventors: Mi Jung Park, Gyeonggi-do (KR); Tae Yeon Kim, Seoul (KR); Yu Mi Ahn, Seoul (KR); Gu Hyun Yang, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 257 days.

(21) Appl. No.: 13/599,064

(22) Filed: Aug. 30, 2012

(65) Prior Publication Data

US 2013/0050533 A1 Feb. 28, 2013

(30) Foreign Application Priority Data

Aug. 31, 2011 (KR) .......................... 10-2011-0087627

(51) Int. Cl.
| | | |
|---|---|---|
| *G06K 9/34* | (2006.01) | |
| *H04N 5/262* | (2006.01) | |
| *G06K 9/32* | (2006.01) | |
| *G06Q 10/10* | (2012.01) | |

(52) U.S. Cl.
CPC ............ *G06K 9/3283* (2013.01); *G06K 9/3258* (2013.01); *G06Q 10/109* (2013.01); *G06K 2209/01* (2013.01)

(58) Field of Classification Search
CPC . G06Q 10/109; G06Q 10/107; G06K 9/3275; G06K 9/3233; G06K 9/00456; G06K 9/00463; G06T 11/60

USPC ............ 382/176; 348/239; 345/619; 715/202
See application file for complete search history.

(56) References Cited

U.S. PATENT DOCUMENTS

| | | | | |
|---|---|---|---|---|
| 5,220,540 | A * | 6/1993 | Nishida ................ | G06Q 10/109 368/41 |
| 6,925,603 | B1 * | 8/2005 | Naito ................... | G06Q 10/109 715/733 |
| 8,583,605 | B2 * | 11/2013 | Roenning ...................... | 707/687 |
| 8,583,784 | B2 * | 11/2013 | Beebe et al. .................. | 709/224 |
| 8,768,308 | B2 * | 7/2014 | Kim et al. .................. | 455/412.2 |
| 2009/0307043 | A1 * | 12/2009 | Cholewinski ........ | G06Q 10/109 705/7.22 |

(Continued)

FOREIGN PATENT DOCUMENTS

| | | |
|---|---|---|
| JP | 11-184924 A | 7/1999 |
| JP | 2003-076820 A | 3/2003 |

(Continued)

OTHER PUBLICATIONS

Black et al., "Automated Event Extraction from Email", Stanford University, Jun. 2, 2004, pp. 1-12.

(Continued)

*Primary Examiner* — Kanjibhai Patel
(74) *Attorney, Agent, or Firm* — Cha & Reiter, LLC

(57) ABSTRACT

A schedule managing method capable of automatically generating schedule data using data extracted from an image, and an apparatus thereof are provided. The schedule managing method preferably includes: setting at least one recognition region within an image; extracting data from the set recognition region; categorizing the extracted data according to a predetermined categorization rule; and generating schedule data using the categorized data.

18 Claims, 11 Drawing Sheets

(56) References Cited

U.S. PATENT DOCUMENTS

2011/0106892 A1    5/2011    Nelson et al.
2012/0083294 A1    4/2012    Bray et al.

FOREIGN PATENT DOCUMENTS

| | | |
|---|---|---|
| KR | 10-2010-0114190 A | 10/2010 |
| WO | 2011-066040 A1 | 6/2011 |

OTHER PUBLICATIONS

Maarek et al., "Tagging the physical world", May 22, 2006, pp. 1-6, Israel.

Chung, "Snapcalendar OCR, A Calendar Event Reader", Berkeley University of California, May 6, 2011, p. 1.

* cited by examiner

FIG. 4
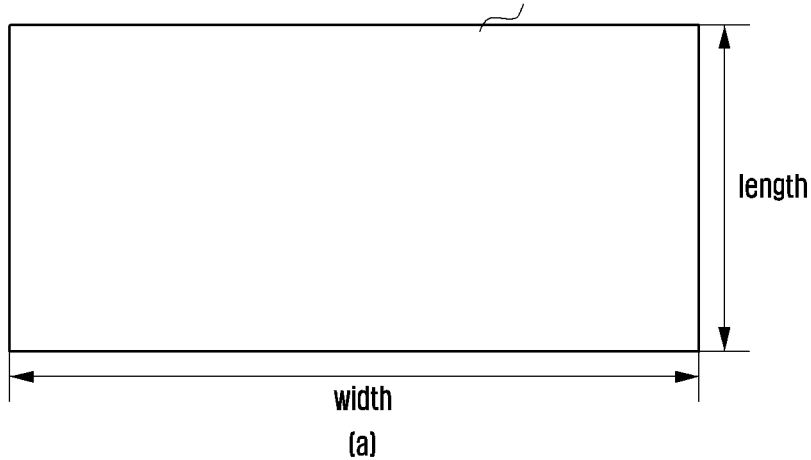
(a)
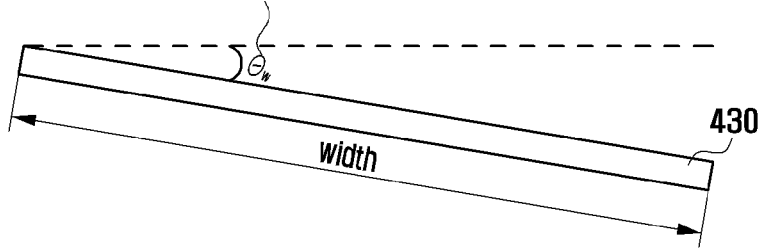
(b)
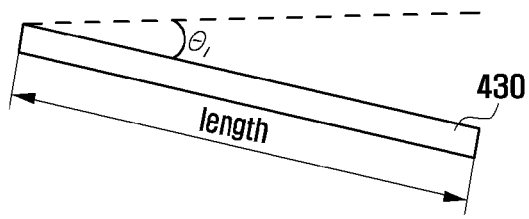
(c)

FIG. 5
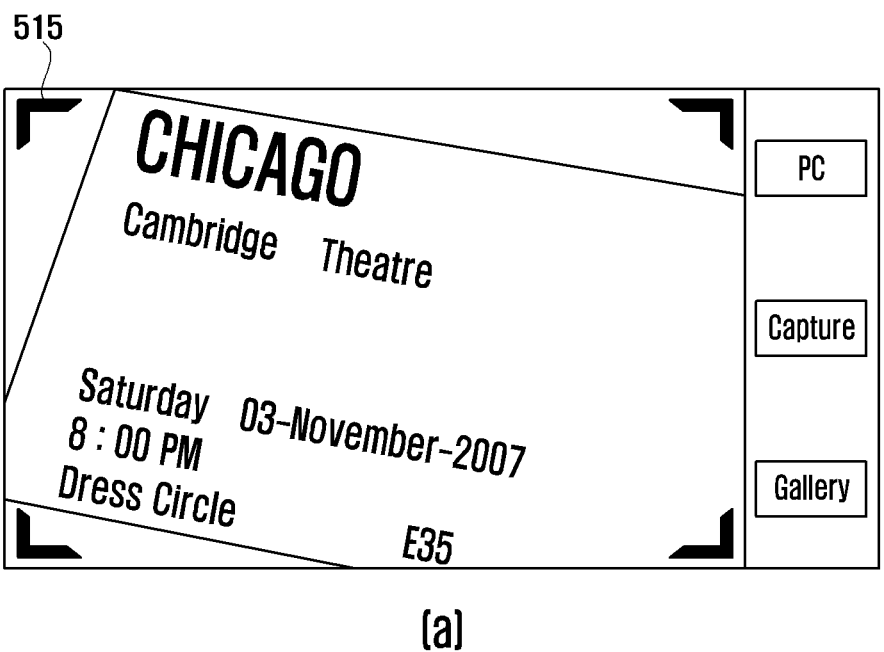
(a)
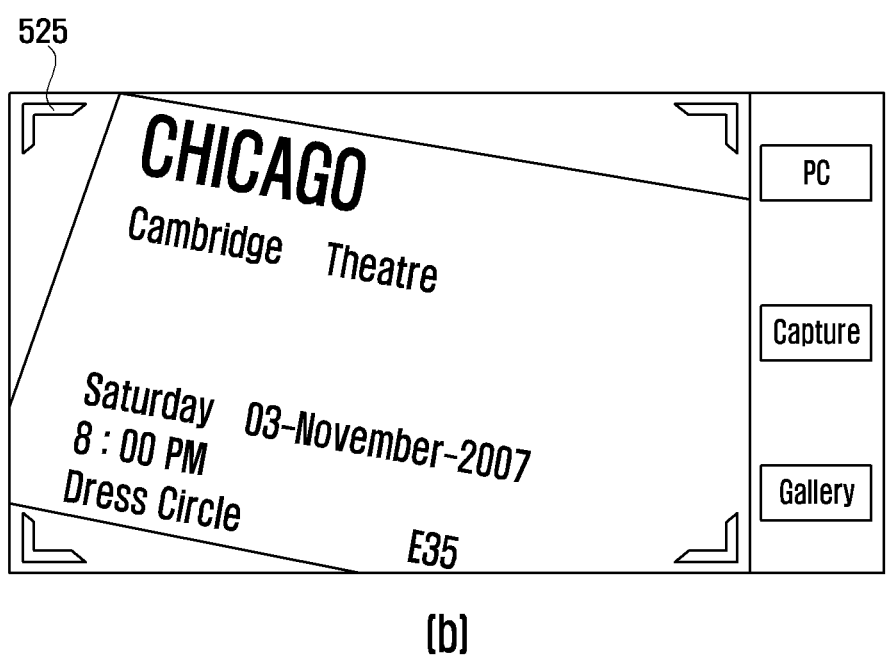
(b)

FIG. 8
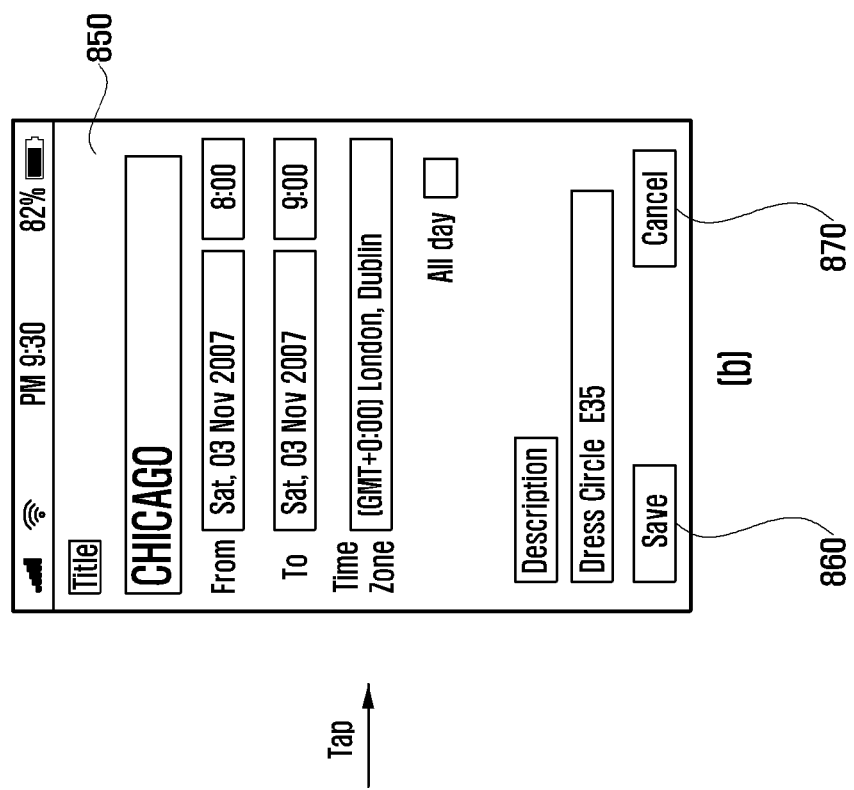
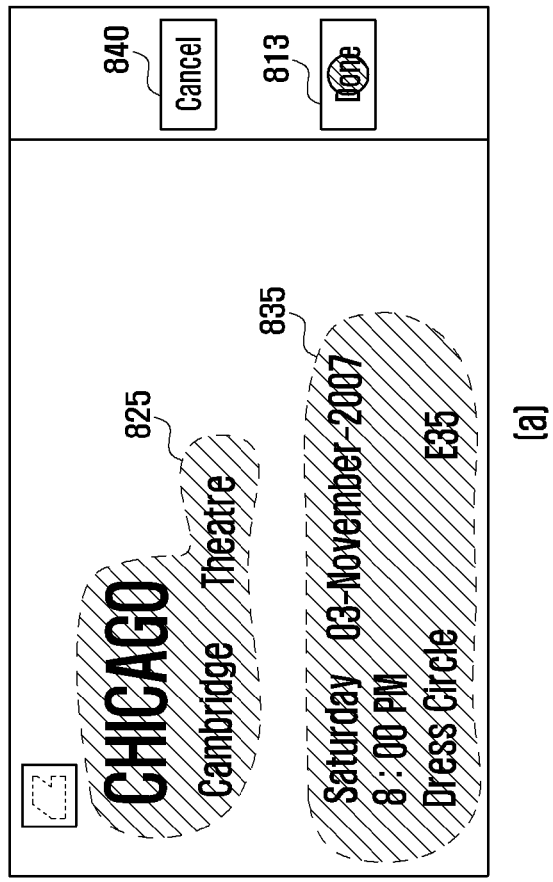

FIG. 9
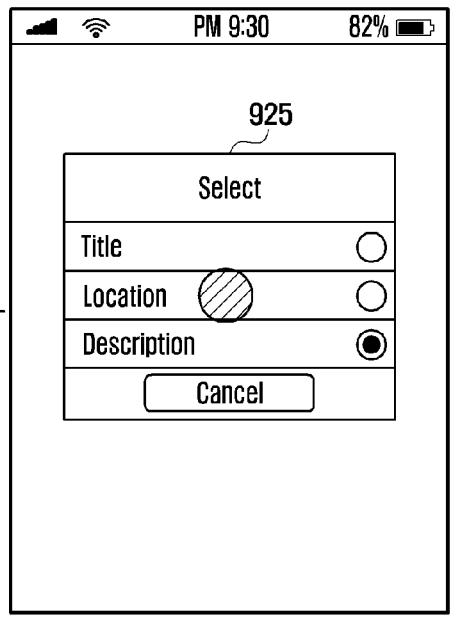
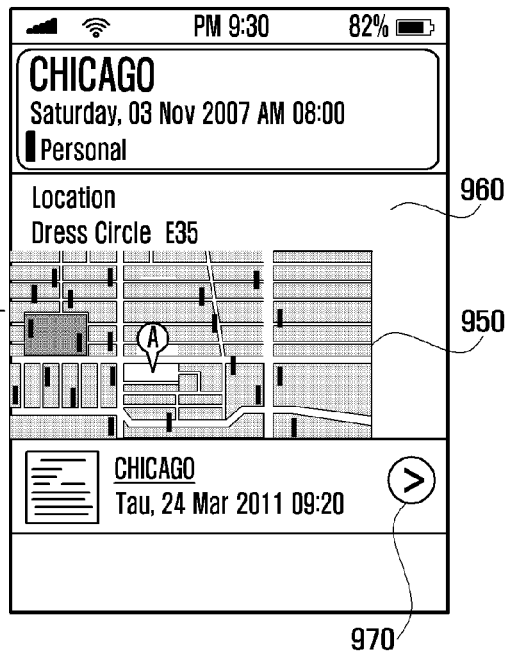

SCHEDULE MANAGING METHOD AND APPARATUS USING OPTICAL CHARACTER READER

CLAIM OF PRIORITY

Applicant claims the benefit of priority from Korean Patent Application No. 10-2011-0087627 filed Aug. 31, 2011, the contents of which are hereby incorporated by reference in its entirety.

BACKGROUND OF THE INVENTION

1. Field of the Invention

The present invention relates to a schedule managing method and apparatus. More particularly, the present invention relates to a schedule managing method capable of automatically generating schedule data using data extracted from an image, and an apparatus thereof.

2. Description of the Related Art

Due to various breakthrough designs and applications that have stimulated consumer demand, the market for purchasing portable terminals has grown rapidly. In particular, unlike existing portable phones having only a limited number of functions, a smart phone may down-load and install various applications for taking a photograph or recording a moving image, playback of audio and video, online games, watching broadcast media, accessing social media network services from an online market, etc.

Meanwhile, more recent portable terminals typically include a touch screen and provide methods for managing a user's schedule through the touch screen. However, in a conventional method for managing a schedule a user has to manually input information including a scheduled date written in a ticket or on a poster, which is inconvenient.

SUMMARY OF THE INVENTION

The present invention addresses one or more of the problems of the prior art, and provides a schedule managing method for recognizing data from an image in order to automatically generate schedule data, and an apparatus thereof.

In accordance with a first exemplary aspect of the present invention there is provided a schedule managing method comprising: setting, by a controller, at least one recognition region within an image to be displayed by a display; extracting data by the controller, data from the set recognition region; categorizing, by the controller, the extracted data according to a predetermined categorization rule; and generating schedule data using the categorized data.

In accordance with a second exemplary aspect of the present invention there is provided a portable terminal comprising: a camera configured to capture an image; a controller configured to extract data from an image received from the camera, to categorize the extracted data according to a predetermined categorization rule, and to generate schedule data using the categorized data; a memory that stores the created schedule data; and a display unit that displays the created schedule data.

Another aspect of the invention provides a computer program comprising instructions configured, when executed, to implement a method and/or apparatus in accordance with any one of the above-described aspects. A further aspect provides machine-readable storage storing such a program.

BRIEF DESCRIPTION OF THE DRAWINGS

The exemplary objects, features and advantages of the present invention will become more apparent from the following detailed description in conjunction with the accompanying drawings, in which:

FIGS. 3, 4 and 5 are views illustrating a function for improving a data recognition rate according to an exemplary embodiment of the present invention;

FIGS. 8 and 9 are views illustrating a schedule creation function according to an exemplary embodiment of the present invention;

DETAILED DESCRIPTION

Figure 1:
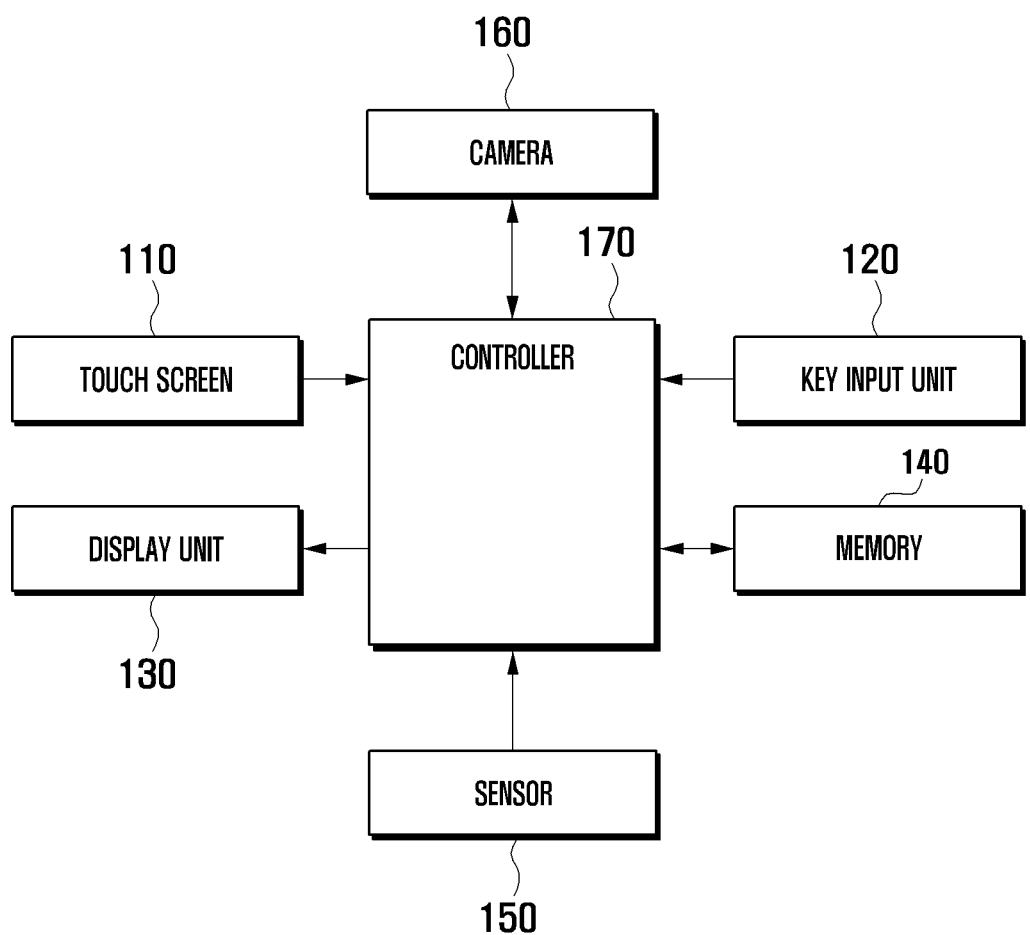
FIG. 1 is a block diagram illustrating a configuration of a schedule managing apparatus according to an exemplary embodiment of the present invention.

A schedule managing method and apparatus according to exemplary embodiments of the present invention are further described herein with reference to the accompanying drawings in detail. The same reference numbers are used throughout the drawings to refer to the same or similar parts. Detailed descriptions of well-known functions and structures incorporated herein may be omitted to avoid obscuring appreciation of the subject matter of the present invention by a person of ordinary skill in the art.

It will be apparent to a person of ordinary skill in the art that a schedule managing apparatus according to the presently claimed invention is applicable to various information communication devices and multi-media devices such as a portable phone, a smart phone, a tablet PC, a handheld PC, a Portable Multimedia Player (PMP), a Personal Digital Assistant (PDA), a music player (e.g., MP3 player), a portable game terminal, or a digital broadcasting player.

A schedule managing apparatus according to the present invention preferably includes an optical character reader and a user input device. The optical character reader may include a camera and a character reading application for recognizing and extracting a character from an image. As known to those skilled in the art, the user input device may comprise at least one of a write pen, a mouse, a touch pad, a track ball, and a touch screen. Hereinafter, for explanatory purposes it is assumed that the schedule managing apparatus of the present invention comprises a smart phone and the user input device comprises a touch screen. The schedule managing apparatus of the present invention preferably includes an application or a widget configured to manage a schedule of a user. In this case, the widget comprises a mini application such as an "app" that allows a user to directly use contents or functions. For example widgets include weather, calendar, calculator, and news widgets. Hereinafter, it is assumed in the present invention that where reference is made to a schedule managing application this includes a schedule managing mini application, app or widget. The schedule managing application may be downloaded from an online market.

In particular, a schedule managing application according to an exemplary embodiment of the present invention may provide a function for recognizing and extracting data from a photographed or stored image, and a function for automatically categorizing the extracted data into one of a group of predetermined categories according to a predetermined categorization rule. Further, the schedule managing application according to embodiments of the present invention may also provide a function for improving a recognition rate of data at the time of photographing or capturing an image. In more detail, the foregoing functions may include a function for compensating for hand trembling while photographing or recording videos, a function for displaying a visual cue, namely, an indicator indicating whether an image to be captured is horizontal based on a tilt input from a sensor, a function for focusing an image to a pointed position by the user in a preview state, namely, in a state while the camera is displaying a photographed image, and a function for setting a photographing mode of the camera according to a type of the image.

FIG. 1 is a block diagram illustrating a configuration of a schedule managing apparatus according to an exemplary embodiment of the present invention.

Referring now to FIG. 1, a schedule managing apparatus of the present invention may preferably include a touch screen 110, a key input unit 120, a display unit 130, a memory 140, a sensor 150, a camera 160, and a controller 170.

The schedule managing apparatus in accordance with FIG. 1 may display a preview screen and an overlapping photographing menu screen. In this case, the photographing menu screen includes a mode selection icon for selecting a photographing mode, a capture icon for capturing a photographed image, namely, a preview screen, and a gallery icon for selecting a stored image.

Further, in one exemplary embodiment of the present invention, the schedule managing apparatus may display an overlapped indicator indicating whether a degree of a tilt of the image is within a predetermined range chosen for optimal character recognition. In other words, the schedule managing apparatus displays the indicator that allows the user to ensure that the camera, and therefore the image to be captured, is aligned with the object to be captured such that characters within the image are aligned with an axis of a display screen, for instance an X axis. Alternatively, the indicator may indicator whether the degree of tilt of the image relative to a horizontal plane is within a predetermined range. Further, the schedule managing apparatus preferably focuses the captured image at a position pointed to by the user. In particular, the schedule managing apparatus according to the present invention preferably supports a multiple focus function. The schedule managing apparatus may display an indicator at the focal point. The schedule managing apparatus may classify modes, for example, classifying a photographing mode into a PC screen photographing mode, a ticket photographing mode, and a poster photographing mode. The schedule managing apparatus may automatically control the magnification of a camera according to the classified photographing mode.

Furthermore, the schedule managing apparatus may display an image capture screen and an overlapping schedule creation menu screen. In this case, the schedule creation menu screen includes a selection tool icon for selecting a recognition region, a release icon, and a termination icon. Further, the schedule managing apparatus extracts data from a selected recognition region, creates schedule data including some or all of the extracted data, and displays a schedule entry screen including a title, a due date, detailed information, and location information of the schedule. Hereinafter, respective structural elements of the schedule managing apparatus will be illustrated in detail.

With continued reference to FIG. 1, a touch screen 110 generates a touch event and transfers the generated touch event to a controller 170 in response to a user touch with respect to a certain point of an image display screen. The touch event may be classified into various categories such as, for example, touch, tap, double tap, press, drag, drag & drop, flick, and drag & flick according to its operation. In this exemplary case, the touch is, for example, an operation in which a user touches one point of the touch screen. The tap is, for example, an operation in which the touches one point of the touch screen and removes the touching object, for instance a finger, from a corresponding point without movement of the finger after touching one point. For a touch event to be classified as a tap may require that the touch is removed from the touch screen within a predetermined period of time. The double tap is, for example, an operation in which a user taps the touch a screen in one area twice within a predetermined period of time. The press is, for example, an operation in which a user removes a finger from a corresponding point of the touch screen without movement of the finger after touching the touch screen for longer than the predetermined period of time to register a tap. The drag is, for example, an operation in which a user moves a finger in a predetermined direction while the user maintains touching contact with the touch screen. The drag & drop is, for example, an operation in which a user removes a finger after dragging the finger. The flick is, for example, an operation in which a user removes a finger after moving the finger at rapid speed across the touch screen. Herein, a drag input may also be referred to as 'scroll'. The drag & flick is, for example, an operation in which a user drags a finger across the touch screen and then flicks the finger at a predetermined time point. In other words, a drag & flick comprises a drag followed by a flick without interruption and without removing the finger from the screen. The controller 160 may, for example, distinguish the flick from the drag based on moving speed. The controller 160 controls the display unit 130 in response to the touch event.

The key input unit 120 comprises one or more keys for operating the schedule managing apparatus, and transferring key input signals to the controller 170. The controller 170, for example, controls the display unit 130 in response to the key input signal. The key input signal may comprise a power on/off signal, a volume control signal, or a screen on/off signal.

With continued reference to FIG. 1, the display unit 130 converts image data received from the controller 170 into an analog signal, and displays the analog signal. In other words, the display unit 130 displays various screens such as a lock screen, a home screen, and an application execution screen according to the use of the schedule managing apparatus. In one particular exemplary case, the lock screen is an image displayed when a power on signal for the display unit 130 is generated. If a trace of a drag touch screen input corresponds to a pre-set trace, the controller 170 changes an image displayed on the screen from a lock screen to a home screen or an application execution screen. The home screen is an image preferably including a plurality of icons for executing an application. If the user touches an icon, the controller 170 may execute a corresponding application and change a displayed image from the home screen to the application execution screen. In particular, an execution screen of a schedule managing application includes the foregoing preview screen, photographing menu screen, capture screen, schedule creation menu screen, and schedule screen.

The display unit 130 may comprise a flat panel display such as a Liquid Crystal Display (LCD) or an Organic Light Emitted Diode (OLED), or any other type of thin-film technology display screen. The display unit 130 may include, for example, a 3D implementing unit for displaying a left image and a right image, and allowing a user to feel depths of the left and right images. As can be appreciated by persons skilled in the art, a 3D implementing scheme is divided into a spectacle scheme and a non-spectacle scheme. The spectacle scheme preferably includes a color filter scheme, a polarizing filter scheme, and a shutter glass scheme. The non-spectacle scheme includes a lenticular lens scheme and a parallax barrier scheme.

The memory 140, which preferably comprises a non-transitory machine readable medium, stores a screen to be outputted on the display unit 130. In particular, the memory may store an execution screen of a schedule managing application as well as an application necessary for a function operation according to an exemplary embodiment of the present invention. Further, the memory 140 may store a key map or a menu map for an operation of the touch screen 110. In this case, the key map and the menu map may comprise various forms. In other words, the key map may comprise, for example, a keyboard map, a 3*4 key map, a Qwerty key map, a Dvorak key map, or a control key map for controlling a currently executed application. Further, the menu map may comprise a menu map for controlling a currently executed application.

With continued reference to FIG. 1, the memory 140 may include a program area and a data area. The program area may store, for example, an operating system (OS) for booting the schedule managing apparatus and operating the foregoing constructions, and an application program for supporting various user functions, for example, a user-function for supporting a call function, a web browser for accessing an Internet server, an MP3 user function for playing other sound sources, an image output function for playing photographs, and a moving image playback function, etc.

In particular, the program area of the present invention may store, for example, the foregoing schedule managing application. The data area comprises an area for storing data created by the controller 160, in particular, to store a schedule according to the use of the schedule managing apparatus, and may, for example, store an image (e.g., map) associated with the schedule, due date information, alarm time, a pre-set value indicating presence of a set snooze function, and detailed information thereof, as some non-limiting examples thereof.

The sensor 150 measures and transfers a tilt of the schedule managing apparatus to the controller 170. In detail, the sensor 150 measures and transfers a horizontal degree $\theta_w$ (referred to as 'width wise tilt' hereinafter) between a horizontal plane and a width wise direction of the schedule managing apparatus, and a horizontal degree $\theta_l$ (referred to as 'lengthwise tilt' hereinafter) and a lengthwise direction of the schedule managing apparatus to the controller 170. The sensor 150 may be implemented by, for example, an acceleration sensor or an inertial sensor.

The camera 160 photographs an image and outputs the captured image to the controller 170. The camera may comprise a camera module including two or more separate cameras, for instance a front camera disposed at a front surface of the terminal, and a rear camera disposed at a rear surface of the terminal.

In particular, the camera 160 may include, for example, a function for controlling amplification, a macro photographing function, a hand trembling correction function to correct for blurred still images and bouncy moving images, and a multiple focusing function. In this case, the camera 160 preferably includes at least two lenses to support the multiple focusing. Multiple focusing is made possible by a software scheme, as can be appreciated by a person of ordinary skill in the art.

The controller 170, which includes a processor or microprocessor, controls an overall operation and signal flow between internal blocks of the schedule managing apparatus. In particular, the controller 170 according to an exemplary embodiment of the present invention controls the display unit 130 to display an execution screen of the schedule managing application in response to an input touch event. Further, the controller 170 guides the suitability of image photographing based on a tilt input from the sensor 150 to the user to provide a type of feedback. Further, the controller 170 controls the camera 160 to perform multiple focusing in response to a touch event input from the touch screen. Further, the controller 170 also extracts data from the focused region, and creates schedule data using the extracted data according to one or more predetermined rules. Further, the controller 170 may extract data from the recognition region set or requested by the user. The functions of the controller 170 are described with reference to accompanying drawings in more detail.

Figure 2:
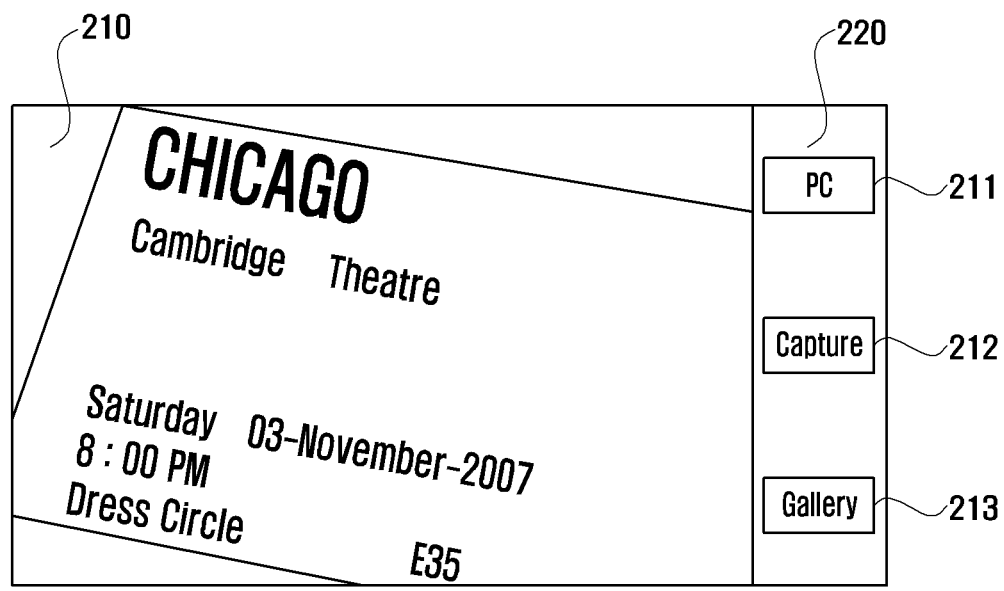
FIG. 2 is a view illustrating a preview screen and a photographing menu screen according to an exemplary embodiment of the present invention.

FIG. 2 is a view illustrating one a preview screen and a photographing menu screen can look according to one exemplary embodiment of the present invention. It will be appreciated that the appearance of the preview screen and the photographing menu screen may vary widely. Referring now to FIG. 2, if an icon for executing a schedule managing application of icons displayed on a home screen is touched, the touch screen 110 transfers a corresponding touch event to the controller 170 for execution of a corresponding action. Accordingly, the controller 170 controls the display unit 130 to display a main screen of the schedule managing application. For example, the schedule screen may be designated as the main screen. If a photographed icon is touched on the main screen, the touch screen 110 transfers a corresponding touch event to the controller 170. Accordingly, the controller 170 drives the camera 160. Further, as shown in FIG. 2, the controller 170 transfers a preview screen 210 input from the camera 160 to the display unit 130 such that the display unit 130 displays the preview screen 210. The controller 170 may control the display unit 130 to overlay the photographing menu screen 220 with the preview screen 210. In this case, the photographing menu screen 220 may include a mode selection icon 211, a capture icon 212, and a gallery icon 213. The user may select a photographing mode in a toggle scheme. In detail, the photographing mode may be classified into a PC screen photographing mode, a ticket photographing mode, and a poster photographing mode. If a PC photographing mode is selected as the photographing mode, the mode selection icon 211 may be display 'PC'. If the user taps or flicks a mode selection icon 211 displaying 'PC', the touch screen 110 transfers a corresponding touch event to the controller 170. Accordingly, the controller 170 controls the display unit 130 such that the mode selection icon 211 displays 'Ticket'. As shown in FIG. 2, a ticket captured by the camera 160 is displayed by the preview screen 210. Further, the controller 170 controls a camera 160 to change currently set amplification to amplification previously designated in a ticket photographing mode. As illustrated previously, the controller 170 performs a control operation to change a mode to a photographing mode of at least one of a PC, a ticket, and a poster according to selection of the mode selection icon 211. Meanwhile, if a capture icon 212 is selected, the controller 170 captures an image input from the camera 160, stores the captured image in the memory 140, and controls the display unit 130 to display a capture screen. Further, if the gallery icon 213 is selected, the controller 170 stops driving of the camera 160. More particularly, the controller 170 controls the display unit 130 to display a stored image instead of a preview screen 210.

Figure 3:

FIGS. 3 to 5 are exemplary views illustrating a function for improving a data recognition rate according to an exemplary embodiment of the present invention. Referring now to FIG. 3, a controller 170 firstly recognizes data from an image input from the camera 160. Then, the controller 170 measures a width wise reference line 301 and a horizontal degree $\phi$ (303, referred to as 'data tilt') of a width wise reference line 302 of the schedule managing apparatus. In this case, the controller 170 may control the display unit 130 to display a width wise reference line 301 of recognized data and a width wise reference line 302 of the schedule managing apparatus. The controller 170 compares the measured data tilt $\phi$ 303 with a predetermined data tilt threshold value Th_$\phi$. In a comparison result, if the measured data tilt $\phi$ is less than the predetermined data tilt threshold value Th_$\phi$, the controller 170 may make the width wise reference lines 301 and 302 disappear.

Referring now to FIG. 4, if the schedule managing application is in a photographing mode, the controller 170 drives the sensor 150. Accordingly, the sensor 150 measures and transfers a width wise tilt $\theta_w$ 431 between a horizontal plane 420 in which the image 410 is located and a width wise direction of the schedule managing apparatus 430 to the controller 170. Further, the sensor 150 measures and transfers a lengthwise tilt $\theta_l$ between the horizontal plane 420 and a lengthwise direction of the schedule managing apparatus 430 to the controller 170. Accordingly, the controller 170 compares the received width wise tilt with a predetermined width wise tilt threshold Th_$\theta_w$. Further, the controller 170 compares the received lengthwise tilt with a predetermined lengthwise tilt threshold Th_$\theta_l$.

Referring now to FIG. 5(a), if conditions of $\phi \leq$Th_$\phi$, $\theta_w \leq$Th_$\theta_w$, and $\theta_l \leq$Th_$\theta_l$ are satisfied in the comparison result, the controller 170 controls the display unit 130 to display a first indicator 515 indicating that recognition of an image satisfies the predetermined conditions.

Conversely, if any one of the foregoing conditions is not satisfied, as shown in FIG. 5(b), the controller 130 controls the display unit 130 to display a second indicator 525 that recognition of the image does not satisfy the predetermined conditions". It is easier (i.e. less computing intensive) to recognize an image that satisfies the above predetermined conditions versus one that does not satisfy the above predetermined conditions. The condition is one example for concretely describing an operation of the present invention and may be varied as desired. In this case, the difference between first indicator 515 and second indicator 525 is that first indicator 515 is fully shaded. However, the person of ordinary skill in the art should understand and appreciate numerous other options can be performed that are within the scope of the claimed invention. For example, the indicators may blink or blink at different rates, can be different sizes, different colors or displayed for different durations.

Figure 6:
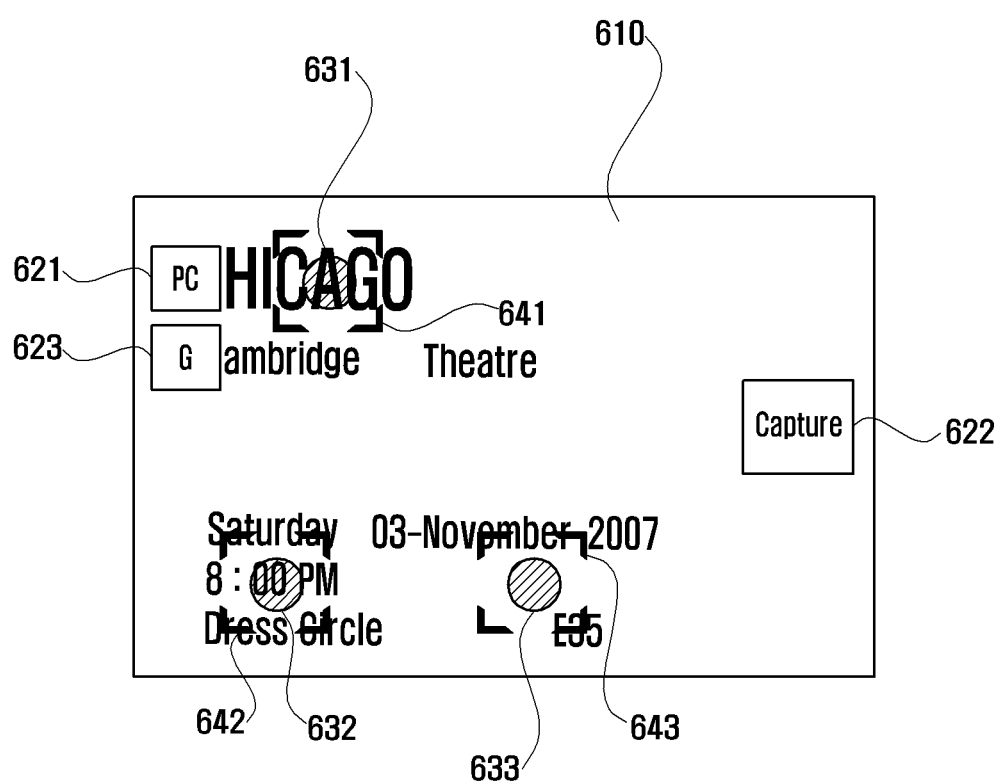
FIG. 6 is a view illustrating a multiple focusing function according to an exemplary embodiment of the present invention.

FIG. 6 is a view illustrating a multiple focusing function according to an exemplary embodiment of the present invention.

Referring now to FIG. 6, the controller 170 controls the display unit 130 to display a preview screen 610. Furthermore, the controller 170 controls a display unit 130 to overlap a mode selection icon 621, a capture icon 622, and a gallery icon 623 with the preview screen 610. If a plurality of certain points 631, 632, and 633 are touched on the preview screen 610, the touch screen 110 transfers a corresponding touch event to the controller 170. Accordingly, the controller 170 controls the display unit 130 to display respective focuses 641, 642, and 643 in certain touched points 631, 632, 633. The controller 170 controls the camera 169 to perform multiple-focusing the certain touched points 631, 632, 633.

Figure 7:
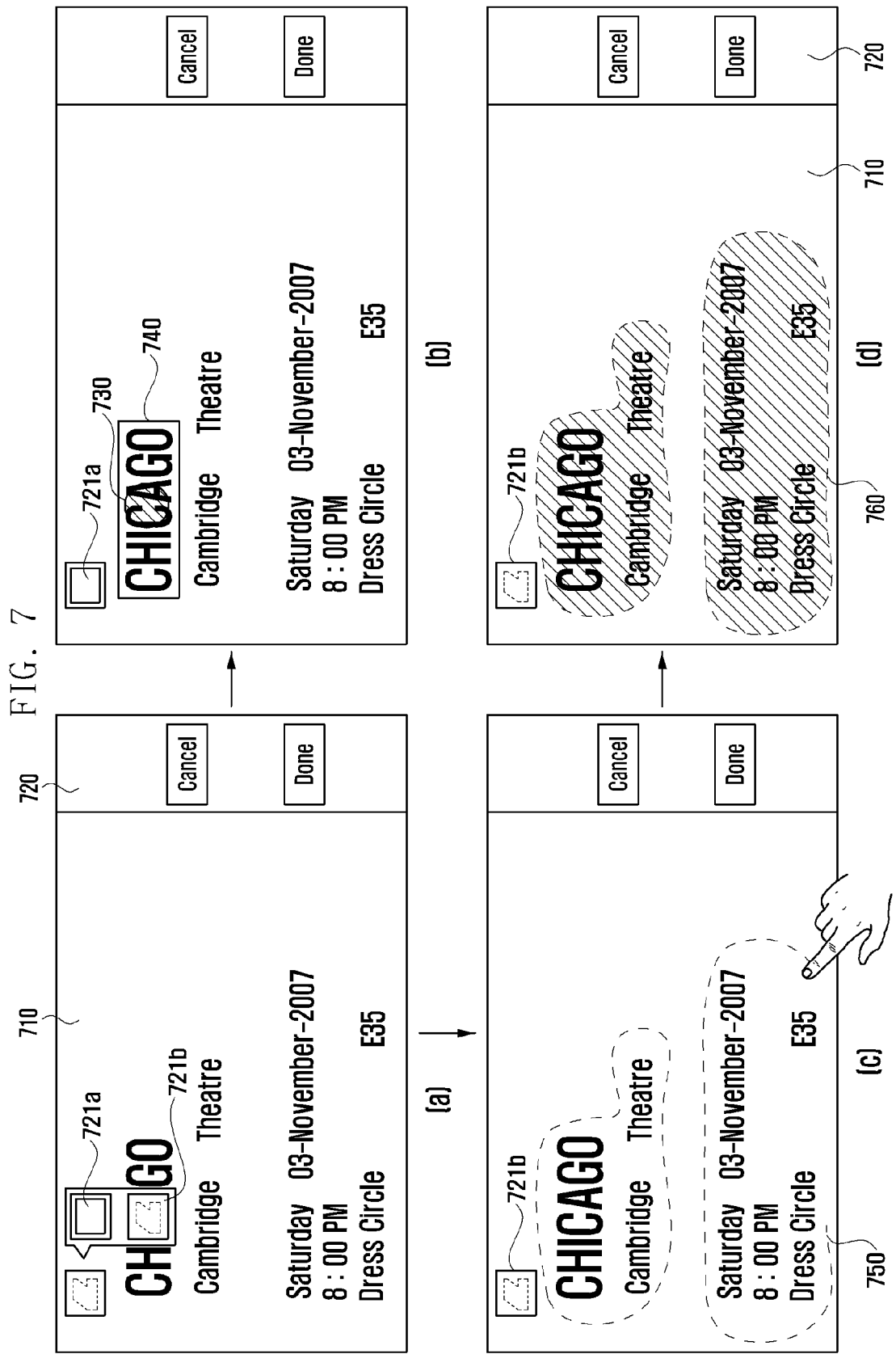
FIG. 7 is a view illustrating a recognition region selection function according to an exemplary embodiment of the present invention.

FIG. 7 is a view illustrating a recognition region selection function according to an exemplary embodiment of the present invention. Referring back to FIGS. 2 and 6, if a capture icon 212 or 622 is selected, a controller 170 captures an image input from a camera 160.

Referring now to FIG. 7(a), the controller 170 controls the display unit 130 to display a capture screen 710 with a captured image. The controller 170 may control the display unit to overlap a schedule data creation menu screen 720 with a capture screen 710. It should be understood that alternatively screens 710 and 720 may occupy different areas shown by the display such that they are not overlapped. A selection tool icon 721 for selecting a recognition region, a release icon (Cancel), and a completion icon (OK), may be included in the schedule creation menu screen 720. Further, the selection tool icon 721 may be configured to include a pre-set FIG. 721a and a user designation FIG. 721b.

If the pre-set FIG. 721a shown in FIG. 7 is selected, the controller 170 sets a recognition region 740 including data located in a touched point 730 based on the touched point 730. Further, the controller 170 controls the display unit 130 to display the set recognition region 740. If the touched point 730 is retouched or a displayed recognition region 740 is touched, the controller 170 releases the set recognition region 740. The controller 170 controls the display unit 130 to make the recognition region 740 disappear. The controller 170 may set a plurality of recognition regions in the foregoing manner.

Meanwhile, if the user designation FIG. 721b is selected, as shown in FIG. 7(c), the controller 170 controls the display unit 130 to display a trace 750 drawn by the user. As shown in FIG. 7(d), when the trace 750 becomes a closed curve 760, the controller 170 sets a region in the closed curve as a recognition region. The set recognition region may be released by user touching.

FIGS. 8 and 9 are views illustrating a schedule creation function according to an exemplary embodiment of the present invention.

Referring to FIG. 8(a), if a completion icon 813 is selected, the controller 170 extracts data from set recognition regions 825 and 835. If a release icon 840 is selected, the screen returns to a preview screen or a main screen.

Next, referring to FIG. 8(b), a controller 170 categorizes extracted data into a group of predetermined categories according to a predetermined categorization rule. In this particular exemplary case, the extracted data may include various information such as images and maps as well as texts. The controller 170 controls the display unit 130 to display a schedule data entry screen 850 including created schedule data. The controller 170 may categorize the portion of the extracted data having the largest font as a title. The controller 170 categorizes information associated with a time in the extracted data as a scheduled date. In this particular case, referring to FIG. 8(b), the scheduled date may include a start time and an end time. The end time may become a value that the controller 170 automatically designates with reference to the start time. In other words, the controller 170 categorizes the extracted time as a start time, and sets one hour after the start time as the end time. When there are a plurality of extracted times, the controller 170 may categorize the earliest time of the extracted times as the start time, and categorize remaining times as detailed information. Further, the controller 170 categorizes remaining data except for data as a title and a scheduled date as detailed information. If a storage icon 860 is selected, the controller 170 stores the created schedule in the memory 140. Conversely, if a release icon 870 is selected, the screen is returned to the preview screen or a main screen.

Referring now to FIG. 9, if the detailed item 915 is selected, a controller 170 controls the display unit 130 to display an item change menu 925. Further, the controller 170 changes an existing item to an item selected from the item change menu 925, for example, "Location". If a completion icon 930 is selected after an item has been changed (for instance to "Location"), the controller 170 may control the display unit 130 to display a schedule screen 960 including location information 950 associated with extracted data within the location item 940. In this case, the location information 950 may be downloaded from a server by the schedule managing apparatus through a network or be extracted from a map stored in the memory 140. If the image view icon 970 is selected, the controller 170 may control the display unit 130 to display a captured image.

Figure 10:
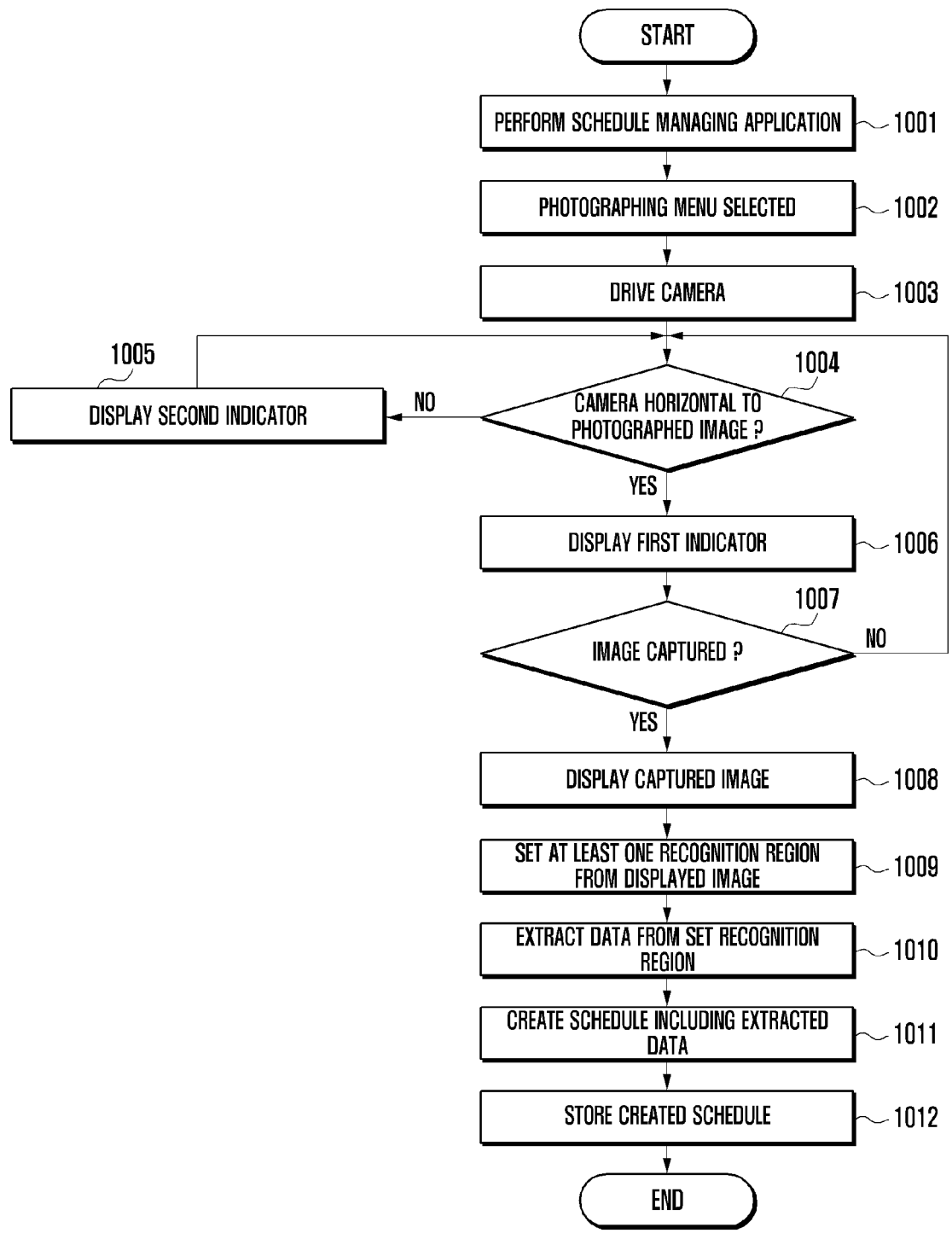
FIG. 10 is a flowchart illustrating a schedule managing method according to an exemplary embodiment of the present invention.

FIG. 10 is a flowchart illustrating exemplary operation of a schedule managing method according to an exemplary embodiment of the present invention.

Referring now to FIG. 10, a controller 170 performs a schedule managing application at step 1001. At step 1002, when a photographing menu is selected from a displayed execution screen, then at step 1003 the controller 170 drives the camera 160. The controller 170 transfers an image input from the camera 160 to the display unit 130 such that the display unit 130 displays the image.

At step 1004, the controller 170 measures a data tilt from an input image. Then, the controller 170 compares the measured data tilt $\phi$ and received camera tilts $\theta_w$ and $\theta_l$ from the sensor 150 to determine whether the camera is horizontal and whether the object to be photographed is aligned with the camera. In other words, the controller 170 determines whether conditions of $\phi \leq Th\_\phi$, $\theta_w \leq Th\_\theta_w$, and $\theta_l \leq Th\_\theta_l$ are satisfied.

If the camera is not horizontal and the object is not aligned with the camera (when any one of the conditions is not satisfied), the controller 170 controls the display unit 130 to display a second indicator 525 at step 1005 indicating that image recognition will require significant processing. Conversely, when the image is horizontal within an error range and the object is aligned with the camera, the controller 170 controls the display unit 130 to display the first indicator 515 at step 1006 indicating that the conditions are satisfied and the recognition of the image requires less processing.

Next, if a capture icon 212 or 612 is selected, the controller 170 captures an image input from the camera 160 and stores the captured image in the memory 140 at step 1007. The controller 130 controls the display unit 130 to display a captured screen including the captured image at step 1008. Subsequently, the controller 170 sets at least one recognition region from a displayed image at step 1009 as described above with reference to FIG. 7. The controller 170 extracts data from the set recognition region at step 1010. The controller 170 creates schedule data including the extracted data according to a predetermined categorization rule at step 1011, for instance as described above with reference to FIG. 8. The controller 170 stores the created schedule data at step 1012.

Figure 11:
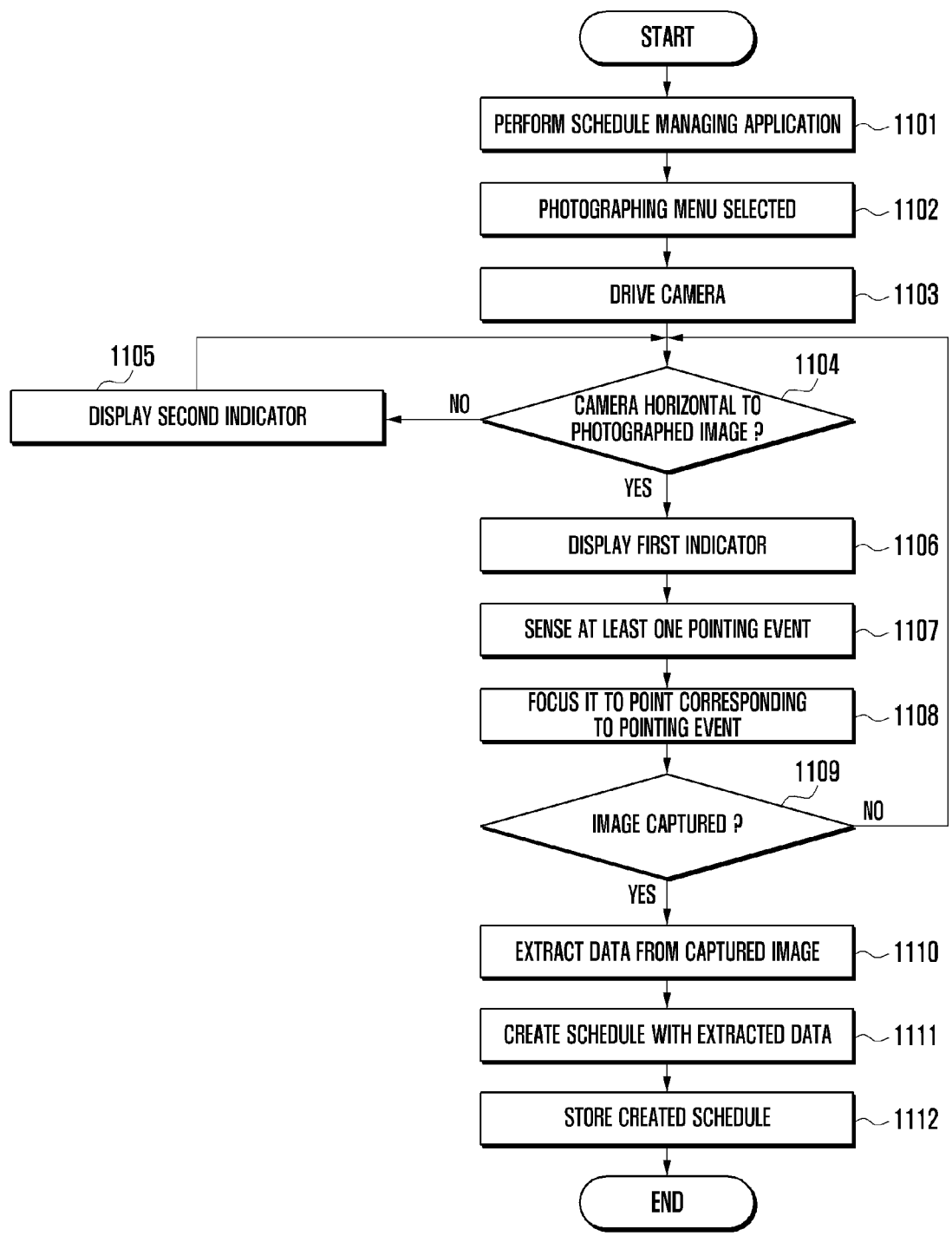
FIG. 11 is a flowchart illustrating a schedule managing method according to another exemplary embodiment of the present invention.

FIG. 11 is a flowchart illustrating a schedule managing method according to another exemplary embodiment of the present invention. Referring now to FIG. 11, steps 1101 to 1106 are identical to steps 1001 to 1006, and so a detailed description thereof is omitted. If at least one pointing event is sensed at step 1107, the controller 170 controls the camera 160 to focus at a point corresponding to a pointing event at step 1108. In other words, the controller 170 sets a recognition region from a preview screen using a focusing function of the camera 160. In this case, the pointing event is a user input event, such as a touch event occurring on the touch screen 110. Further, the controller 170 controls the display unit 130 to display a focus icon at the pointing point. If the capture icon 212 or 622 is selected, the controller 170 captures an image input from the camera 160 and stores the captured image in the memory 140 at step 1109. The controller 170 then extracts data from the captured image at step 1110. The controller 170 categorizes the extracted data to create schedule data according to a predetermined categorization rule at step 1111 as discussed above with reference to FIG. 8. The controller 170 stores the created schedule data at step 1112.

Advantageously, a schedule managing method and apparatus according to embodiments of the present invention allow data to be recognized from an image received from a camera or a stored image to automatically generate schedule data.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, thumbnail, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Accordingly, some of the exemplary embodiments of the present invention provide machine executable code for implementing apparatus or a method as claimed in any one of the claims of this specification and a machine-readable storage storing such a program. Still further, such programs may be conveyed electronically to the device via any medium such as a communication signal carried over a wired or wireless connection that is then stored on a non-transitory machine readable for execution and embodiments suitably encompass the same.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other exemplary aspect, embodiment or example described herein unless incompatible therewith.

It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

Although a schedule managing method and apparatus according to exemplary embodiments of the present invention have been described in detail hereinabove, it should be clearly understood that many variations and modifications of the basic inventive concepts herein taught which may appear to those skilled in the present art will still fall within the spirit and scope of the present invention as defined by the appended claims.

We claim:

1. A schedule managing method comprising:
    displaying an image;
    in response to a tap being performed on the image, selecting, by a controller, a portion of the image where the tap is performed as a recognition region, wherein the portion of the image that is selected includes at least one full word of text;
    extracting, by the controller, data from the recognition region by converting image data representing the at least one full word of text into textual data;
    categorizing, by the controller, the extracted data including the textual data according to a predetermined categorization rule; and
    generating a schedule record using the categorized data.

2. The method of claim 1, wherein categorizing the extracted data comprises categorizing the portion of the extracted data as an event date.

3. The method of claim 1, wherein categorizing the extracted data comprises categorizing the portion of the extracted data as detailed information.

4. The method of claim 1, wherein the categorization rule includes classifying an earliest time indicated by the extracted data as a start time.

5. The method according to claim 4, wherein the controller categorizes remaining times indicated by the extracted data as detailed information.

6. The method of claim 1, further comprising displaying a schedule screen including the schedule record.

7. A method comprising:
    receiving an image from a camera;
    measuring a tilt value of the image relative to an axis of the camera;
    comparing the tilt value with a first threshold to determine whether the image is aligned with the axis of the camera; and
    outputting a first indication that the image is aligned with the axis of the camera in response to the tilt value satisfying the first threshold;
    setting, by a controller, at least one recognition region within the image;
    extracting data by the controller from the recognition region;
    categorizing, by the controller, the extracted data according to a predetermined categorization rule; and
    generating a schedule record using the categorized data.

8. The method of claim 7, further comprising:
    receiving a tilt input signal from a sensor; and
    comparing the tilt input signal with a second threshold, wherein the first indication is displayed further in response to the tilt input signal meeting the second threshold.

9. The method of claim 8, further comprising displaying a second indication that the image is misaligned with the camera in response to the tilt value failing to meet the first threshold.

10. The method of claim 8, further comprising detecting an input at a first location in the image, wherein the recognition region is set at the first location, in response to the input.

11. The method of claim 7, wherein the first indication is output when conditions $\phi \leq Th\_\phi$, $\theta_w \leq Th\_\theta_w$, and $\theta_l \leq Th\_\theta_l$ are satisfied, in which $\phi$ is the tilt value of the image, $Th\_\phi$ is the first threshold, $Th\_\theta_w$ is a second threshold value $Th\_\theta_l$, is a third threshold value l, $\theta_w$ is a widthwise tilt relative to a horizontal plane, and $\theta_l$ is a lengthwise tilt relative to the horizontal plane.

12. An electronic device comprising a memory, a display unit, a camera arranged to capture an image, and a controller arranged to:
    display the image;
    in response to a tap being performed on the image, select a portion of the image where the tap is performed as a recognition region, wherein the portion of the image that is selected includes at least one full word of text;
    extract data from the image received from the camera by converting image data in the image representing the at least one full word of text into textual data;
    categorize the extracted data according to a predetermined categorization rule; and
    generate a schedule record using the categorized data;
    store the schedule record in the memory; and
    display the schedule record on the display unit.

13. The electronic device of claim 12, wherein categorizing the extracted data comprises categorizing the portion of the extracted data as an event date.

14. The electronic device of claim 12, wherein categorizing the extracted data comprises categorizing the portion of the extracted data as detailed information.

15. The electronic device of claim 12, wherein the categorization rule includes classifying an earliest time indicated by the extracted data as a start time.

16. An electronic device comprising a memory, a display unit, a camera arranged to capture an image, and a controller arranged to:
    detect a tilt of the image relative to an axis of the camera, compare the tilt with a first threshold to determine whether the image is aligned with the axis of the camera, and
    output an indication that the image is aligned with the axis of the camera when the first threshold is met;
    set at least one recognition region within the image;
    extract data from the recognition region;
    categorize, by the controller, the extracted data according to a predetermined categorization rule; and
    generate a schedule record using the categorized data.

17. The electronic device of claim 16, further comprising a sensor arranged to measure and a tilt angle of the electronic device relative to a horizontal plane, wherein the controller is further arranged to compare the tilt angle from the sensor with a second threshold to determine a position of the electronic device relative to the horizontal plane.

18. The electronic device of claim 17, wherein the controller is further arranged to detect an input at a first location in the image, and the recognition region is set at the first location, in response to the input.

* * * * *